Feb. 17, 1959 S. C. ROCKAFELLOW 2,874,335
NEGATIVE HOLD TIME CIRCUIT
Filed April 29, 1957
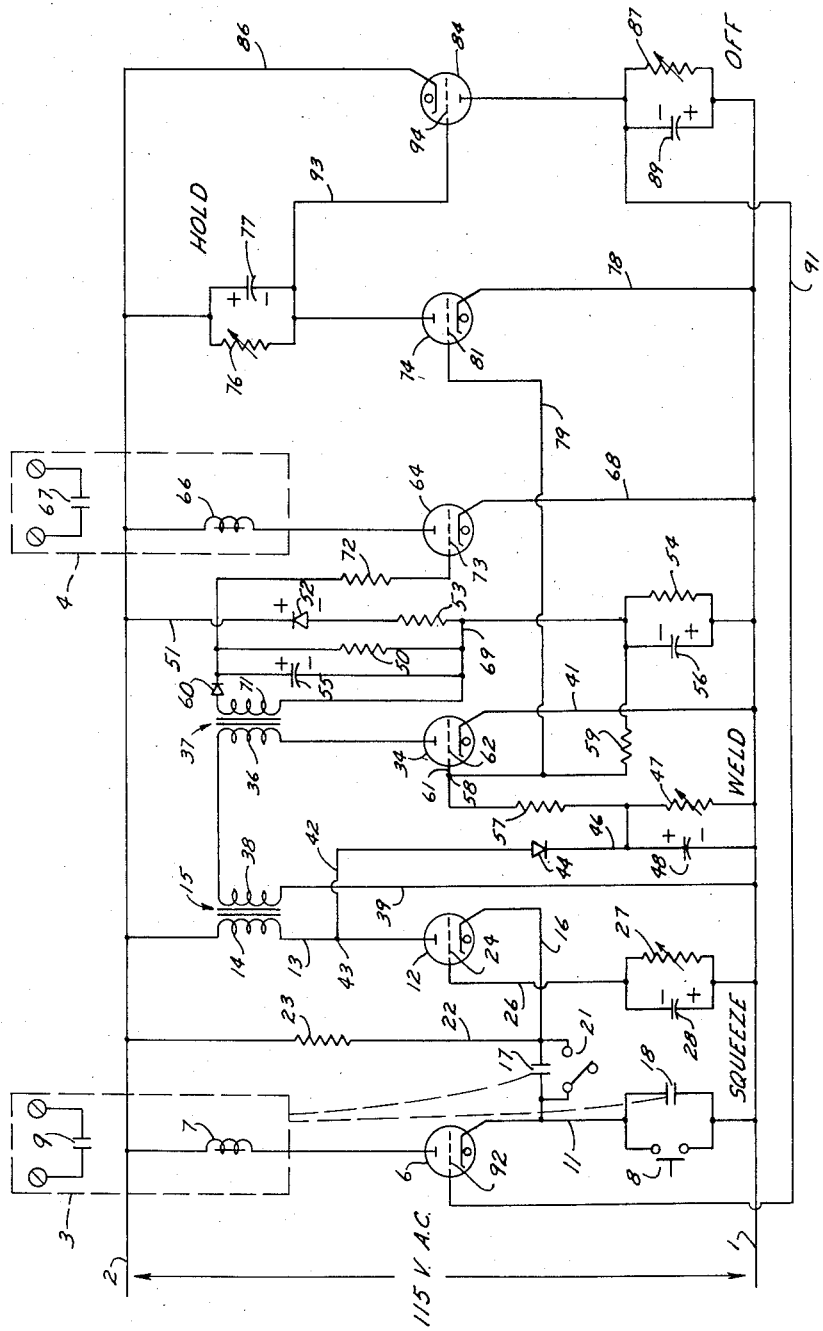
INVENTOR.
STUART C. ROCKAFELLOW
BY
Woodhams Blanchard & Flynn
ATTORNEYS

United States Patent Office 2,874,335
Patented Feb. 17, 1959

2,874,335

NEGATIVE HOLD TIME CIRCUIT

Stuart C. Rockafellow, Plymouth, Mich., assignor to Robotron Corporation, Detroit, Mich., a corporation of Michigan Application April 29, 1957, Serial No. 655,554

7 Claims. (Cl. 315—230)

This invention relates to an electronic sequence timing circuit for resistance welding apparatus. In particular, this invention relates to an improved circuit for accomplishing a negative hold time function. This application relates to the subject matter of my co-pending application, Serial No. 570,447, filed March 9, 1956, and entitled "Timer for High Speed Resistance Welding Operation." In its narrower aspects, this application is directed to an improvement in the circuit disclosed in my Patent No. 2,776,383, issued January 1, 1957.

As is discussed in detail in my co-pending application, Serial No. 570,447, it is sometimes desired, particularly for high speed resistance welding operations, to actuate the means causing opening of the welding electrodes prior to termination of the flow of the welding current therethrough. This technique is employed in order to compensate for the time lag between energization of the mechanism opening the electrodes and the actual movement of the electrodes thereby, so that the welding electrodes begin to open immediately after termination of the flow of welding current. The time interval between the energizing of the electrode opening mechanism and the termination of the flow of welding current is usually referred to in the art as "negative hold time."

It has been suggested to accomplish a negative hold time function by simultaneously initiating the operation of the weld timer and the hold timer, and so calibrating the intervals timed by the aforesaid timers that the hold timer times out a few cycles before the weld timer times out. This type of operation has been found to be undesirable because it requires careful and time-consuming calibration of the weld timer and hold timer for each production run, which calibration must be carefully maintained for successful operation.

Further, while the circuit disclosed in the aforementioned co-pending application is satisfactory for accomplishing the desired negative hold time function, it is a circuit of rather special design and presents special problems in setting it up for operation and in maintaining it in proper operating condition. The circuit disclosed in my aforementioned patent, No. 2,776,383, has attained widespread commercial acceptance and its operation and the manner in which it should be adjusted to perform the desired functions of "Weld," "Squeeze," "Hold" and "Off," are well understood by technicians familiar therewith. Further, the patented circuit has numerous operating advantages as compared with the circuit disclosed in my aforementioned co-pending application. Thus, it has been desired to modify the patented circuit in order to render said circuit suitable for performing a negative hold time function, while retaining the special advantages which this circuit has for performing the other welding functions.

Accordingly, it is an object of this invention to provide an improved sequence timing circuit for resistance welders, which circuit is adapted for performing a negative hold time function.

It is a further object of this invention to provide an improved circuit, as aforesaid, in which the weld and hold timers will operate sequentially, and in which the flow of welding current will continue for a predetermined time period following the timing out of the weld timer.

It is a further object of this invention to provide improvements in the sequence timing circuit disclosed in Patent No. 2,776,383, which improvements will enable the circuit to perform a negative hold time function, if desired.

It is a further object of this invention to provide an improved sequence timing circuit, as aforesaid, which does not require material modification of the circuit of my aforementioned patent, in which the desired negative hold time function may be accomplished by the addition of a few simple circuit components to the patented circuit, and which improved circuit will retain all of the advantages of the patented circuit.

It is a further object of this invention to provide an improved circuit, as aforesaid, for performing the usual welding functions, including negative hold time, which does not require special calibration techniques or equipment, which uses the standard operating principles of my aforementioned patented circuit and which is easily adjusted to perform the desired functions by technicians acquainted with my patented circuit.

Other objects and advantages of this invention will become apparent to persons acquainted with apparatus of this type upon reading the following specification and inspecting the accompanying drawing, which is a circuit diagram of the circuit to which the present invention relates.

General description

In meeting the objects and purposes above set forth, I have utilized as a beginning point a circuit substantially similar to that disclosed in my Patent No. 2,776,-383. I have added to the aforesaid circuit a time constant network connected to the control electrode of the thyratron or other tube controlling the supply of welding current to the welding electrodes. The additional time constant circuit is so connected that it will maintain the flow of welding current after the Weld timer has timed out and the Hold timing function has begun. The additional time constant circuit functions upon the expiration of the timing period of the usual Weld timing circuit employed in my aforementioned patent to maintain the flow of welding current for a further predetermined time, so that the flow of welding current and the operation of the Hold time circuit overlap.

While the use of the additional timing circuit in the manner above discussed has particular utility as applied to my aforementioned patented circuit, it will be apparent that this principle, namely, the use of an additional timing circuit in addition to the usual Weld and Hold timing circuits, for the purpose of maintaining the flow of the welding current for a time interval after timing-out of the weld timer, may be applied to other sequence timing control circuits for electric resistance welders. Accordingly, it will be understood that the fundamental principle of this invention is applicable to other circuits than the one specifically shown herein, and that the timing circuit here shown is for illustrative purposes only and is not limiting.

Detailed description

Referring to the drawing, there is shown a pair of bus conductors 1 and 2, which are adapted to be energized in a conventional manner from any convenient source of alternating potential. A plurality of electric discharge devices, hereinafter designated in detail, are connected to each other and to said bus conductors for the purpose of controlling the relays 3 and 4. The relay 3 controls the opening and closing of welding electrodes and the relay 4 controls the turning on and off of the welding current.

Each of the electric discharge devices are of the gas filled type having an anode and a cathode and one or two control electrodes, commonly known as "thyratrons" and hence, for purposes of convenience and reference, and not as limiting, the electric discharge devices will be designated as thyratrons hereinafter. The thyratron 6 is connected at its anode through the winding 7 of the relay 3 to the bus conductor 2, and at its cathode by the conductor 11 through the switch 8, which may be any conventional form of manually operated switch, to the bus conductor 1. The contacts 9 of said relay 3 may be connected in a conventional manner to effect opening and closing of the welding electrodes.

The thyratron 12 is connected at its anode by the conductor 13 through the primary winding 14 of the first transformer 15 to the bus conductor 2. Said thyratron 12 is connected at its cathode by the conductor 16 through the contacts 17 of the relay 3 to a point on the conductor 11 between the switch 8 and the cathode of the thyratron 6. The contacts 18 of relay 3 are connected around the switch 8. Manually operated switch 21 is connected around contacts 17. A conductor 22 connects the cathode of the thyratron 12 through a resistance 23 of relatively high value, as 50,000 ohms, to the bus conductor 2. The control electrode 24 of thyratron 12 is connected by the conductor 26 through the variable resistance 27 to the bus conductor 1. A capacitor 28 is connected around the variable resistance 27.

The thyratron 34 is connected by its anode through the primary winding 36 of a second transformer 37 hence through the secondary winding 38 of the first transformer 15 and the conductor 39 to the bus conductor 1. The cathode of said thyratron 34 is connected by the conductor 41 directly to the bus conductor 1. A conductor 42 connects a junction point 43, located between the anode of the thyratron 12 and the primary winding 14, through the rectifier 44 and thence through the conductor 46 and the variable resistance 47 to the bus conductor 1. The capacitor 48 is is connected around the variable resistance 47. A conductor 51 connects the bus conductor 2 through the retifier 52, through a resistance 53, thence through a resistance 54, to the bus conductor 1. A capacitor 56 is connected around the resistance 54. A resistor 57 is connected from the conductor 46 to a junction point 58, and a resistor 59 is connected from the conductor 51 to the junction point 58 and said junction point is connected by the conductor 61 to the control electrode 62 of the thyratron 34. The sense of the rectifier 44 is such that its positive side is connected to the capacitor 48 and the sense of the rectifier 52 is such that its negative side is connected to the capacitor 56. The values of the several parts are such that the positive potential imposed at the junction point 58 by the capacitor 48 is normally materially larger than the negative potential imposed at said junction point by the capacitor 56. The exact amount by which said positive potential exceeds said negative potential is controlled by the variable resistance 47.

The thyratron 64 is connected by its anode through the winding 66 of relay 4 to the bus conductor 2. The contacts 67 of said relay 4 are adapted to control the flow of welding current in a conventional manner. The cathode of said thyratron is connected by conductor 68 to the bus conductor 1.

The conductor 69 connects the negative side of capacitor 56 through the resistance 50 and thence through the protective resistance 72 to the control electrode 73 of the thyratron 64. A capacitor 55 is connected around resistance 50 and is connected by means including the rectifier 60 to the opposite ends of the secondary winding 71 of the second transformer 37. The sense of the rectifier 60 is such that the side of capacitor 55 which is connected to the control electrode 73 of thyratron 64 is normally charged positive.

The thyratron 74 is connected by its anode through the variable resistance 76 to the bus conductor 2. The capacitor 77 is connected around the variable resistance 76. The cathode of said thyratron is connected by the conductor 78 to the bus conductor 1. A conductor 79 connects the junction point 58 to the control electrode 81 of the thyratron 74.

The thyratron 84 is connected from its cathode by the conductor 86 to the bus conductor 2. It is further connected by its anode through a variable resistance 87 to the bus conductor 1. A capacitor 89 is connected around the variable resistance 87. The anode of the thyratron 84 is also connected by a conductor 91 to the control electrode 92 of the thyratron 6. The conductor 93 connects the anode of the thyratron 74 to the control electrode 94 of the thyratron 84.

*Operation*

In its "at rest" condition prior to the closing of the initiating switch 8, the apparatus is in the following condition:

The thyratron 6 is non-conductive and the relay 3 is de-energized because of the open cathode circuit of thyratron 6. Accordingly, the electrodes of the welding machine, which are controlled by the contacts 9 of the relay 3, are open.

The capacitor 28 is charged by current flowing between the two bus conductors by cathode-to-grid conduction of the thyratron 12. The capacitor 48 is likewise charged from current flowing between the bus conductors through the primary winding 14, the rectifier 44 and the variable resistance 47. Similarly, the capacitor 56 is charged by current flowing between the bus conductors through the resistance 54, the resistance 53 and the rectifier 52.

The thyratron 12 is non-conductive due to its open cathode circuit and the thyratron 34 is non-conductive because there is no anode potential. The thyratron 64 is non-conducting due to a negative potential appearing on its control electrode 73 by reason of the charging of the capacitor 56. The thyratron 74 is conducting inasmuch as the positive potential on the side of the capacitor 48, which is connected to the junction point 58 and thence to the control electrode 81, is materially larger than the negative potential on the side of the capacitor 56 which is also connected to the junction point 58. The thyratron 84 is held blocked by the anode potential by the thyratron 74 being supplied to the control electrode 94 through the conductor 93.

Upon closing of the initiating switch 8, thyratron 6 conducts, energizing the relay 3 and thereby closing its contacts 9, 17 and 18. The closing of the contacts 9 energizes the solenoid which closes the welding electrodes. The closing of the contacts 18 shunts the initiating switch to hold said thyratron 6 conductive when the initiating switch is released.

The closing of the relay contacts 17 brings the cathode of the thyratron 12 to the potential of the bus conductor 1 to which the grid 24 is also connected through the variable resistance 27, and thus the grid-to-cathode conduction through said thyratron 12 is terminated. This terminates the charging of the capacitor and applies a negative potential from said capacitor onto the grid 24 for holding said thyratron 12 blocked until the charge on said capacitor 28 drains off through the variable resistance 27. The time required for the charge to drain off through the variable resistance 27 to a sufficiently low point to permit conduction of the thyratron 12 is the time delay between the closing of the contacts 9 and thereby the closing of the welding electrodes and the initiating of the welding current. This time period is commonly known as "Squeeze Time" and is controlled by the setting of the variable resistance 27.

With the conduction of the thyratron 12, the junction point 43 is effectively brought to the potential of the bus conductor 1, and hence flow of current through the variable resistance 47 is terminated. This stops the charging of the capacitor 48 and it commences to drain out the variable resistance 47 with results to be hereinafter described. Simultaneously, the conduction of the thyratron 12 energizes the secondary winding 38 of the transformer 15 and thereby provides an anode potential for the thyratron 34. This effects conduction of thyratron 34 and thus energizes the secondary winding 71 of the transformer 37. Such energization of said secondary winding overcomes the negative bias placed onto the control electrode 73 by the capacitor 56 and thus permits conduction of the thyratron 64. This energizes the winding 66 of relay 4 and closes the contacts 67 of said relay whereby the flow of welding current commences. Energization of said secondary winding also effects a charging of the capacitor 55 with the positive side of said capacitor being connected to the control electrode 73 of the thyratron 64.

In the meantime, the capacitors 48 and 56 have both been draining through their respectively connected resistances 47 and 54. However, the resistance 47 is materially less than the resistance 54 so that the negative charge on the capacitor 56 ultimately predominates over the positive charge on the capacitor 48 and in a predeterminable period of time, selected according to the setting of the variable resistance 47, the predominance of said negative charge is sufficient to effect blocking of the thyratron 34. With the blocking of said thyratron, there ceases to be pulses generated in the secondary winding 71 for overcoming the negative charge from said capacitor 56 applied to the control electrode 73. However, the charge on capacitor 55 then becomes effective to supply a further positive potential to control electrode 73 to overcome the negative charge from the capacitor 56 and thereby maintain thyratron 64 conductive. The capacitor 55 will drain out according to the value of resistances 50 and 72 and at some predetermined time the negative charge from capacitor 56 will predominate and will cause the thyratron 64 to become non-conductive. This de-energizes the relay 4 and opens its contacts 67 and terminates the flow of the welding current.

Simultaneously with the blocking of thyratron 34, the negative blocking potential on the conductor 61 is also applied by the conductor 79 to the control electrode 81 of the thyratron 74 by which said thyratron is blocked. This terminates the charging of the capacitor 77 and same begins to drain through the variable resistance 76. This represents the "Hold Time" period. As soon as said capacitor 77 drains sufficiently that its charge which is applied through the conductor 93 to the control electrode 94, becomes insufficient to hold the thyratron 84 blocked, said thyratron will conduct and apply a potential through the conductor 91 to the control electrode 92 of the thyratron 6. This blocks thyratron 6 and the relay 3 is de-energized. With the de-energization of the relay 3, the relay contacts 9 open and the welding electrodes are thereby permitted to open.

The conduction of the thyratron 84 also charges the capacitor 89, its capacity being such that a single pulse is sufficient to render it fully charged.

The de-energization of relay 3 also opens relay contacts 17 and 18 and thereby restores the system to the "at rest" condition described above. This at rest condition includes the re-energizing of the control electrode 94 from the anode of thyratron 74 and thereby effecting the blocking of the thyratron 84. This terminates the charging of the capacitor 89 and the biasing of the control electrode 92 from the anode of the thyratron 84, but the potential on the capacitor 89 will hold the control electrode 92 under negative potential until said charge drains out through variable resistance 87. Thus, the thyratron 6 will be held blocked for a period of time, the "Off Time," determined by the time required for the charge on the capacitor 89 to diminish to a level sufficiently low that the thyratron 6 is no longer blocked.

When the charge on the control electrode 92 is sufficiently low as to permit the thyratron 6 to again become conductive, whether or not it will do so depends on the position of the manually operated switches 8 and 21. For repeat operation, the initiating switch is held closed and the switch 21 is held open. Thus, during the period when the thyratron 6 is blocked, that is, during the "Off" period, the contacts 17 of the relay 3 are open which terminates the conduction of the thyratron 12 by opening its cathode circuit. Thus, grid-to-cathode conduction again occurs through the thyratron 12 and, in the manner detailed above, the capacitor 28 again becomes charged. Similarly, the capacitor 48 again becomes charged so that its positive potential imposed at the junction point 58 again overcomes the negative potential of the capacitor 56 and thus renders the thyratron 34 ready for conduction upon the appearance of an anode supply. Similarly, conduction again starts through the thyratron 74 and, as above set forth, the charging of the capacitor 77 effects blocking of the thyratron 84.

As soon as the charge on the capacitor 89 drains out through the variable resistance 87 and the thyratron 6 is thereby again rendered conductive, with the switch 8 being held closed, the cycle above described again is initiated in the manner above set forth.

When it is desired to operate the device for a single operation, the switch 21 is held closed. Thus, thyratron 12 cannot be de-energized until the initiation switch 8 is open. Thyratron 74 will be held non-conductive by the continuing negative charge on the capacitor 56 and this permits thyratron 84 to continue conduction and thereby hold thyratron 6 blocked for as long as initiation switch 8 is closed. When said switch is open, thyratron 6 ceases to conduct and the whole system returns to the "at rest" condition outlined above.

It will be apparent that the operation of the weld timing means (the capacitor 48 and resistance 47) and the operation of the hold timing means (the capacitor 77 and resistance 76) will be sequential inasmuch as the hold timing means does not begin to time out until the thyratron 74 becomes non-conductive. The thyratron 74 becomes non-conductive simultaneously with the blocking of thyratron 34, which blocking occurs upon the timing out of the weld timing means. The timing circuit including the capacitor 55 and resistances 50 and 72 will operate at the end of the timing function of the weld timing means, to provide an additional fixed period of conduction of the thyratron 64 after the weld timing means has timed out and after the hold timing means has begun to time out. Thus, the hold timing means will begin to time out prior to termination of the flow of welding current and the circuit will thereby perform a negative hold time function.

Although the above mentioned drawing and description refer to a particular, preferred embodiment of my invention, it is not my intention, implied or otherwise, to eliminate other variations or modifications, which do not depart from the scope of the invention, unless specifically stated to the contrary in the hereinafter appended claims.

I claim:

1. A sequence timing circuit including; an electric space discharge device having an anode, a cathode and a control electrode; a load connected in series with said device; means including a first and a second timing network connected to said control electrode for controlling the conductivity of said device and means connected to said first and second timing networks for initiating the timing operation of said second network at the end of the timing operation of the first network so that said device will remain in the same electrical condition for the duration of both the intervals timed by said first and second networks.

2. A sequence timing circuit, including; a first electric space discharge device having an anode, a cathode and a control electrode, a load connected in series with said first device; a second electric space discharge device having an anode, a cathode and a control electrode, a second load connected in series with said second device; three timing networks, the first and second of said timing networks being connected to the control electrode of said first device for controlling the conductivity thereof, the third of said networks being connected to the control electrode of said second device for controlling the conductivity of said second device; means for initiating the timing operation of said second and third timing networks at the end of the timing period of said first timing network so that said first device remains conductive while said third timing network begins its timing function with respect to said second device.

3. In a sequence timing circuit including; a first thyratron having a load connected in its anode circuit, a source of constant potential whose negative terminal is connected to the control electrode of the first thyratron; means, including a second thyratron for supplying a positive potential to the control electrode of said first thyratron for rendering same conductive when said second thyratron is conductive; and a first timing network connected to the control electrode of said second thyratron for controlling the conductivity thereof, the improvement which comprises: a second timing network connected to the control electrode of said first thyratron for supplying positive potential thereto for a predetermined time period and means for initiating operation of said second timing network after said second thyratron becomes non-conductive whereby the time period of conductivity of said first thyratron is controlled by the first and second timing networks which operate successively.

4. In a sequence timing circuit which includes a first thyratron having a load connected in the anode circuit thereof; a source of constant potential whose negative terminal is connected to the control electrode of said first thyratron; means, including a second thyratron, for supplying a positive potential to the control electrode of said first thyratron for rendering same conductive when said second thyratron is conductive; a third normally conductive thyratron; a first timing network connected to said third thyratron for controlling actuation of a second load when said third thyratron becomes non-conductive; a second timing network connected to the control electrodes of said second and said third thyratrons whereby timing out of said second timing network effects blocking of said second and third thyratrons, the improvement which comprises: a third timing network connected to the control electrode of said first thyratron, said third timing network including a capacitor and means connected to said second thyratron for charging said capacitor when said second thyratron is conductive and for discharging said capacitor when said second thyratron becomes non-conductive, said capacitor being connected to the control electrode of said first thyratron for supplying positive potential thereto to maintain same conductive a predetermined time period after said second and said third thyratrons become non-conductive.

5. A sequence timing circuit including: a first thyratron having a load connected in the anode circuit thereof; a source of constant D. C. potential whose negative terminal is connected to the control electrode of said first thyratron to normally render same non-conductive; a second thyratron; a transformer, the primary winding of said transformer being connected in the anode circuit of said second thyratron, the secondary winding of said transformer being connected to the control electrode of said first thyratron whereby a positive potential is supplied thereto to render same conductive when said second thyratron is conductive; a source of constant D. C. potential whose negative terminal is connected to the control electrode of said second thyratron; a first capacitor resistor timing network connected to the control electrode of said second thyratron; a third thyratron and means connecting the control electrode thereof to the control electrode of said second thyratron; switch means for initiating operation of said first network, said first network being adapted to supply a positive potential to overcome said source of D. C. potential to permit conduction of said second and third thyratrons, said positive potential being adapted to decrease after operation of said first network is initiated whereby said source of D. C. potential effects a blocking of said second and third thyratrons a predetermined time period after initiation of operation of said first network; a second capacitor resistor timing network connected in parallel with the secondary winding of said transformer whereby the capacitor thereof is charged when current flows through said transformer, the positive side of said capacitor being connected to said control electrode of said first thyratron and being adapted to maintain same conductive for a predetermined time period after said second and third thyratrons become non-conductive.

6. In a sequence timing circuit for a welding system, the combination comprising: a first electric space discharge device for controlling the flow of welding current and a second electric space discharge device for controlling the termination of welding pressure, each of said devices having an anode, a cathode and control electrode means; first and second timing networks connected to the control electrode means of said first device for controlling the conductivity thereof and thereby controlling the length of time a flow of welding current; a third timing network connected to the control electrode means of said second device for controlling the conductivity thereof and thereby controlling the termination of welding current; means for initiating the timing operation of said second and third timing networks at the end of the timing period of said first timing network so that said first device remains conductive to permit flow of welding current while said third timing network begins its timing function with respect to said second device to control the termination of welding pressure.

7. In a sequence timing circuit for a welding system, the combination comprising: a first electric space discharge device for controlling the flow of welding current; a second electric discharge device for controlling the initiation of welding pressure and a third electric discharge device for controlling the termination of welding pressure, each of said devices having an anode, a cathode and control electrode means; first and second timing networks connected to the control electrode means of said first device for controlling the conductivity thereof and thereby controlling the length of time of flow of welding current, a third timing network connected to the control electrode means of said third device for controlling the conductivity thereof and thereby controlling the termination of welding pressure; a fourth timing network connected to said third device so that its timing operation is initiated in response to conduction of said third device corresponding to termination of welding pressure; means connecting said fourth network to said first network for initiating the timing operation of said first network a predetermined time after the end of the timing operation of said fourth timing network; means for initiating the timing operation of said second and third networks at the end of the timing period of said first timing network so that said first device remains conductive and welding current continues to follow while said third timing network begins its timing function with respect to said third device.

References Cited in the file of this patent
UNITED STATES PATENTS
2,639,361   Hartwig, et al. _____ May 19, 1953